United States Patent
Watanabe

(10) Patent No.: US 11,880,805 B2
(45) Date of Patent: Jan. 23, 2024

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventor: Kenichiro Watanabe, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 504 days.

(21) Appl. No.: 17/021,014

(22) Filed: Sep. 15, 2020

(65) Prior Publication Data
US 2021/0304144 A1 Sep. 30, 2021

(30) Foreign Application Priority Data
Mar. 25, 2020 (JP) .................. 2020-054192

(51) Int. Cl.
| | |
|---|---|
| G06Q 10/10 | (2023.01) |
| G06Q 30/02 | (2023.01) |
| G06Q 30/06 | (2023.01) |
| G06Q 10/06 | (2023.01) |
| G06Q 50/00 | (2012.01) |
| G06Q 10/105 | (2023.01) |
| G06Q 30/018 | (2023.01) |
| G06F 3/0482 | (2013.01) |

(52) U.S. Cl.
CPC .......... G06Q 10/103 (2013.01); G06Q 50/01 (2013.01); G06F 3/0482 (2013.01); G06Q 10/105 (2013.01); G06Q 30/0185 (2013.01)

(58) Field of Classification Search
CPC .... G06Q 10/103; G06Q 50/01; G06Q 10/105; G06Q 30/0185; G06F 3/0482
USPC ................................... 705/1.1–912
See application file for complete search history.

(56) References Cited

U.S. PATENT DOCUMENTS

| | | | |
|---|---|---|---|
| 10,331,303 B1* | 6/2019 | Gurtin | G06F 3/0482 |
| 2017/0134316 A1* | 5/2017 | Cohen | H04L 51/216 |
| 2018/0287982 A1* | 10/2018 | Draeger | H04L 51/216 |
| 2019/0028287 A1* | 1/2019 | Jin | H04L 67/1097 |
| 2019/0386842 A1* | 12/2019 | Silva | H04L 51/046 |
| 2020/0106630 A1* | 4/2020 | Bourassa | H04L 12/1818 |
| 2021/0026504 A1* | 1/2021 | Apthorp | G06Q 50/01 |

FOREIGN PATENT DOCUMENTS

JP 2007-108827 A 4/2007

* cited by examiner

*Primary Examiner* — Jonathan P Ouellette
(74) *Attorney, Agent, or Firm* — Oliff PLC

(57) ABSTRACT

An information processing device includes a processor configured to cause an activity element identifier that identifies an activity element defined in an activity management service, and for which a trail that indicates an electronic document to be registered is defined, to be stored in a memory in association with a channel identifier that identifies a channel defined in a communication service, and in a case where an electronic document already posted to the channel is selected by a user in the communication service, cause the electronic document to be registered as the trail of the activity element associated with the channel.

18 Claims, 12 Drawing Sheets

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-054192 filed Mar. 25, 2020.

BACKGROUND

(i) Technical Field

The present disclosure relates to an information processing device and a non-transitory computer readable medium.

(ii) Related Art

Japanese Unexamined Patent Application Publication No. 2007-108827 discloses a workflow system that includes a workflow management system for managing workflows and a bulletin board system. The workflow system is capable of managing target data (for example, an electronic form of an application for purchasing goods) related to an activity defined in the workflow management system.

SUMMARY

Meanwhile, an activity management service in which multiple activity elements are defined and multiple electronic documents related to each activity element may be registered has been proposed in the past. In this specification, an electronic document to be registered in relation to each activity element is referred as a "trail". According to such an activity management service, a user is able to easily understand whether or not a trail related to each activity element has been registered.

One example of an activity management service is a work process management service for managing work processes that include a series of work operations. In this case, for example, each activity element is a step (hereinafter referred to as a work step) included in a work process, and the trail indicates an electronic document (such as an estimate sheet, for example) that is relevant to fulfilling each work step. Obviously, however, the activity management service is not limited to the above.

On the other hand, a communication service in which multiple users are able to post messages or electronic documents as attachments in pre-created channels has been proposed in the past. When one of the multiple users posts a message or an electronic document to a certain channel, other users accessing the channel are able to view the message or the electronic document.

Aspects of non-limiting embodiments of the present disclosure relate to associating an activity element defined in an activity management service, and for which a trail indicating an electronic document to be registered is stipulated, with a channel of a communication service, and also to registering an electronic document posted to a channel and selected by a user as the trail of the activity element of the activity management service associated with the channel.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device including a processor configured to cause an activity element identifier that identifies an activity element defined in an activity management service, and for which a trail that indicates an electronic document to be registered is defined, to be stored in a memory in association with a channel identifier that identifies a channel defined in a communication service, and in a case where an electronic document already posted to the channel is selected by a user in the communication service, cause the electronic document to be registered as the trail of the activity element associated with the channel.

BRIEF DESCRIPTION OF THE DRAWINGS

An exemplary embodiment of the present disclosure will be described in detail based on the following figures, wherein.

DETAILED DESCRIPTION

Figure 1:
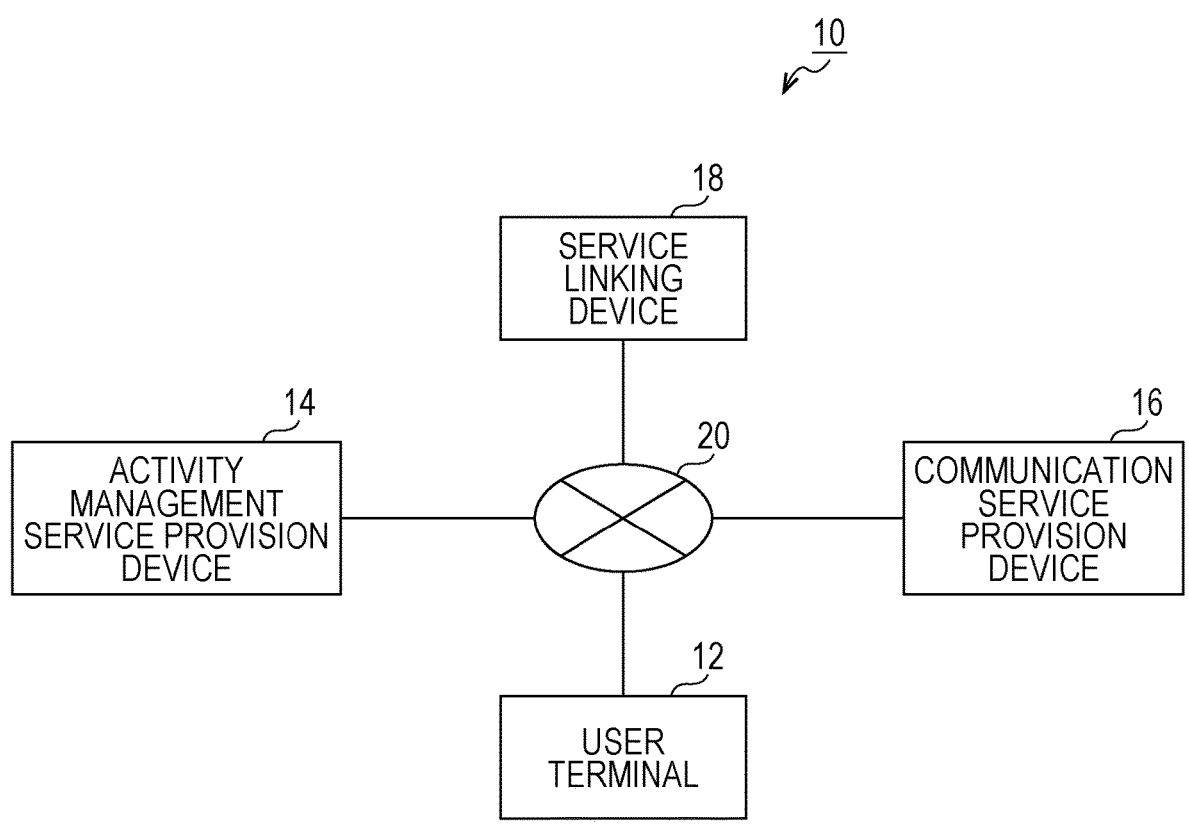
FIG. 1 is a schematic configuration diagram of a service linking system according to an exemplary embodiment.

FIG. 1 is a schematic configuration diagram of a service linking system 10 according to an exemplary embodiment of the present disclosure. The service linking system 10 includes one or multiple user terminals 12, an activity management service provision device 14, a communication service provision device 16, and a service linking device 18 that acts as an information processing device. The user terminal(s) 12, the activity management service provision device 14, the communication service provision device 16, and the service linking device 18 are communicably interconnected through a communication channel 20 such as a local area network (LAN) or the Internet.

Each user terminal 12 is a terminal used by a user who uses an activity management service provided by the activity management service provision device 14 and a communication service provided by the communication service provision device 16. Each user terminal 12 is a terminal such as a personal computer, a smartphone, or a tablet, for example. Each user terminal 12 is provided with a communication interface that includes a network adapter or the like, memory that includes a hard disk, RAM, ROM, or the like, a display that includes a liquid crystal display device or the like, an input interface that includes a mouse, a keyboard, a touch panel, or the like, and a processor that includes a CPU, a microcontroller, or the like.

The activity management service provision device 14 is a server computer, for example. Specifically, the activity management service provision device 14 is provided with a communication interface that includes a network adapter or the like, memory that includes RAM, ROM, or the like, and a processor that includes a CPU, a microcontroller, or the like. The activity management service provision device 14 provides the activity management service to users. Specifically, if a user registers with the activity management service and is authenticated by (that is, logs in to) the activity management service, the user is able to use the activity management service. Note that because the activity management service is capable of providing the activity management service to a large number of users, tenants are defined in groups of one or multiple users (where each user group corresponds to a company, for example). With this arrangement, for example, a user belonging to a certain user group (for example, Company A) is only able to access Tenant A corresponding to Company A.

The activity management service is a service that manages user activity. The activity may be any of various types of activity, including but not limited to work, club activity, and personal activity, for example. In the activity management service, a user defines one or multiple activity elements in advance, and the activity management service manages user activity for each of the one or multiple defined activity elements. For example, in the case where the activity management service is a work management service that manages work, each activity element is a work element representing one unit of work for instance. As another example, in the case where the activity management service is a club activity management service that manages club activity, each activity element represents one unit of club activity (such as a practice or a competition, for example). As another example, in the case where the activity management service is a personal activity management service that manages personal activity, each activity element represents one unit of personal activity (such as study or planning, for example).

In the exemplary embodiment, multiple activity elements are defined in a hierarchal structure in the activity management service. For example, in the case where the activity management service is a work process management service that manages work processes, the work processes are defined with respect to a work project, which is a superordinate activity element in the hierarchal structure. Additionally, each work project contains one or multiple inferior activity elements (in other words, activity elements that are performed to carry out the work processes), which are defined as one or multiple work steps. By structuring the activity elements in a hierarchal structure and displaying the hierarchal structure to a user, the user is able to grasp relationships between multiple activity elements appropriately. For example, the user is able to understand that completing a certain work project involves completing multiple subordinate work steps defined for the work project. However, multiple activity elements do not necessarily have to exist in a hierarchal structure.

In this way, in the case where a collection of sequential activities for which one or multiple steps are defined (that is, an activity process) exists in the activity management service, the individual steps correspond to subordinate activity elements and the collective activity process corresponds to a superordinate activity element, but a hierarchal structure of such a type is merely one example. As another example, in the case of a work management service for instance, superordinate categories collecting work projects of the same type may be defined and the individual work projects may be defined as subordinate elements, while in the case of a club activity management service, the superordinate category "Competitions" may be defined and individual competitions such as "Match ABC" and "Match XYZ" may be defined as subordinate elements.

In the activity management service, an electronic document to be registered in relation to each activity element may be defined. As described above, information indicating such an electronic document is called a trail. Multiple trails may be defined with respect to a single activity element. Users are able to register electronic documents in association with each activity element as each trail, and the activity management service manages the electronic documents registered by the users. In this specification, an electronic document registered as a trail is referred to as a "trail document".

For each activity element, an activity element member allowed to use the activity element may also be defined. For example, an activity process may be defined such that a superordinate activity element (for example, a work project) is usable only by a user in higher position of authority (such as a manager, for example), whereas a subordinate activity element (for example, a work step) is usable by a user responsible for the subordinate activity element (the person in charge, for example) as well as a user able to user the superordinate activity element. A user able to use a superordinate activity element may also be allowed to use the subordinate activity element unconditionally on the basis of the hierarchal structure among the activity elements. Note that being able to use an activity element means either or both of being able to view the activity element and being able to register a trail related to the activity element.

Each of the above definitions related to the activity management service is defined by someone such as a person in the position of managing activity (for example, a superior, a project manager, or a department head) among the users.

In the activity management service, an activity process ID that identifies an activity process, an activity element ID that acts as an activity element identifier that identifies multiple activity elements included in the activity process, a trail ID that acts as a trail identifier that identifies a trail defined for each activity element, hierarchy information indicating the hierarchal structure of the multiple activity elements in the activity process, information indicating the activity element members of each activity element, and trail documents registered as each trail are stored in association with each other.

In this specification, an example in which the activity management service is a work process management service that manages work processes is described below. However, as described earlier, the activity management service is not limited to the following.

Figure 2:
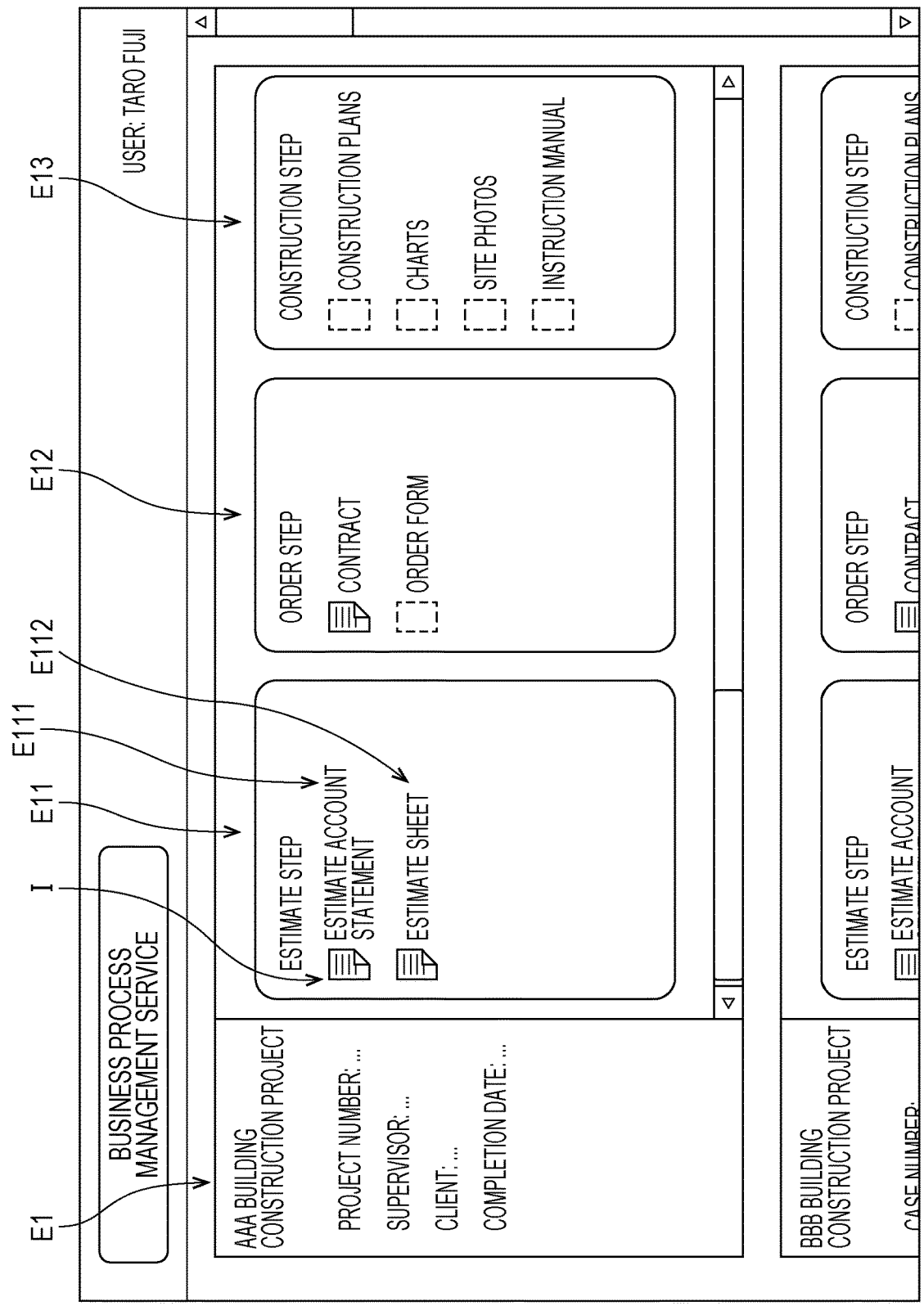
FIG. 2 is a diagram illustrating an example of an activity management screen provided to a user terminal by an activity management service.

FIG. 2 is a diagram illustrating an example of an activity management screen provided to a user terminal 12 by the activity management service. When a user logs in to the activity management service, an activity management screen like the one illustrated in FIG. 2 is displayed on the display of the user terminal 12. In the exemplary embodiment, on the activity management screen, multiple activity elements for each activity process defined in the activity management service are displayed in a format that indicates the hierarchal structure. It may also be configured such that only the activity elements that are usable by the user are displayed on the activity management screen.

In the exemplary embodiment, a work project is defined as the highest superordinate activity element within a single work process, and work steps included in the project are defined as subordinate activity elements one level below. For example, "AAA Building Construction Project" is defined as the highest superordinate activity element, and "Estimate Step", "Order Step", and "Construction Step" are defined as the subordinate activity elements. Obviously, other work steps may also be defined as subordinate activity elements. Also, although not illustrated in FIG. 2, step groups into which multiple work steps are collected may also be defined as activity elements positioned intermediately in the hierarchal structure between the work project and the work steps. For example, a step group "Finishing Step Group" is defined subordinate to the work project "AAA Building Construction Project", and the work steps "Exterior Finishing Step" and "Interior Finishing Step" are defined subordinate to the step group.

As FIG. 2 illustrates, on the activity management screen, the hierarchical relationship of the multiple activity elements in each of the multiple activity processes is displayed in a format that is understandable to the user. Specifically, inside a frame E1 that represents the highest superordinate activity element ("AAA Building Construction Project"), frames E11, E12, and E13 representing the subordinate activity elements ("Estimate Step", "Order Step", and "Construction Step") are displayed. In the case where more subordinate activity elements (work steps) are defined, frames representing the additional work steps may be displayed by a method such as horizontal scrolling, for example.

Furthermore, in the exemplary embodiment, one or multiple trails are defined with respect to each work step. A trail in the present example indicates the type of electronic documents to be registered to complete each work step. In the present example, the trail "Estimate Account Statement" and the trail "Estimate Sheet" are defined for the "Estimate Step", the trail "Contract" and the trail "Order Form" are defined for the "Order Step", and the trail "Construction Plans", the trail "Charts", the trail "Site Photos", and the trail "Instruction Manual" are defined for the "Construction Step".

As FIG. 2 illustrates, on the activity management screen, the trails defined for each work step are displayed in a format that is understandable to the user. Specifically, inside the frame E11 that represents a work step, character strings E11' and E112 that represent the trails defined for the work step are displayed. The same applies to the frames E12 and E13 representing the other work steps. As described above, because a trail may also be treated as an activity element, the display format may also be considered to be a format in which the trails that are the subordinate activity elements with respect to a work step that is the superordinate activity element are displayed in a way that clearly indicates the hierarchal structure.

Also, on the activity management screen, the user is able to grasp whether or not each trail document has been registered. In the exemplary embodiment, a trail icon I is displayed beside the character string representing a trail for which a trail document has been registered. The trail icon I is not displayed beside the character string representing a trail for which a trail document has not been registered. Obviously, whether or not a trail document has been registered may also be indicated by another display format. In the example of FIG. 2, in the "AAA Building Construction Project", the trail icon I is displayed beside the character strings representing the trail "Estimate Account Statement" and the trail "Estimate Sheet" of the "Estimate Step" and also the character string representing the trail "Contract" in the "Order Step", but the trail icon I is not displayed beside the character strings representing the other trails. With this arrangement, the user is able to easily understand that in the "AAA Building Construction Project", trail documents have been registered for the trail "Estimate Account Statement" and the trail "Estimate Sheet" of the "Estimate Step" and also for the trail "Contract" in the "Order Step", but trail documents have not been registered yet for the other trails.

Returning to FIG. 1, the communication service provision device 16 is a server computer, for example. Specifically, the communication service provision device 16 is provided with a communication interface that includes a network adapter or the like, memory that includes RAM, ROM, or the like, and a processor that includes a CPU, a microcontroller, or the like. The communication service provision device 16 provides the communication service to users. Specifically, if a user registers with the communication service and is authenticated by (that is, logs in to) the communication service, the user is able to use the communication service. The provider of the activity management service and the provider of the communication service may be different entities. Note that because the communication service is capable of providing the communication service to a large number of users, tenants are defined in groups of one or multiple users (where each user group corresponds to a company, for example). With this arrangement, for example, a user belonging to a certain user group (for example, Company A) is only able to access Tenant A corresponding to Company A.

In the communication service, a user is able to create (define) a channel. Multiple channels may be defined by multiple users. A channel is a "place" so to speak where multiple users post messages. Multiple users are able to post messages in a created channel, and other users accessing the channel are able to view the posted messages. Also, a user is able to post an electronic document stored in the user terminal 12 to a channel as an attachment. The posted attachment is transmitted to the communication service provision device 16 and stored. The posted attachment is downloadable by other users accessing the channel.

For each channel, channel members who are able to use the channel may be defined. Note that being able to use a channel means either or both of being able to view messages or attachments posted to the channel and being able to post messages or attachments to the channel.

In the communication service, a channel ID that acts as a channel identifier that identifies a channel, messages and attachments posted to the channel, and information indicating the channel members of each channel are stored in association with each other.

Figure 3:
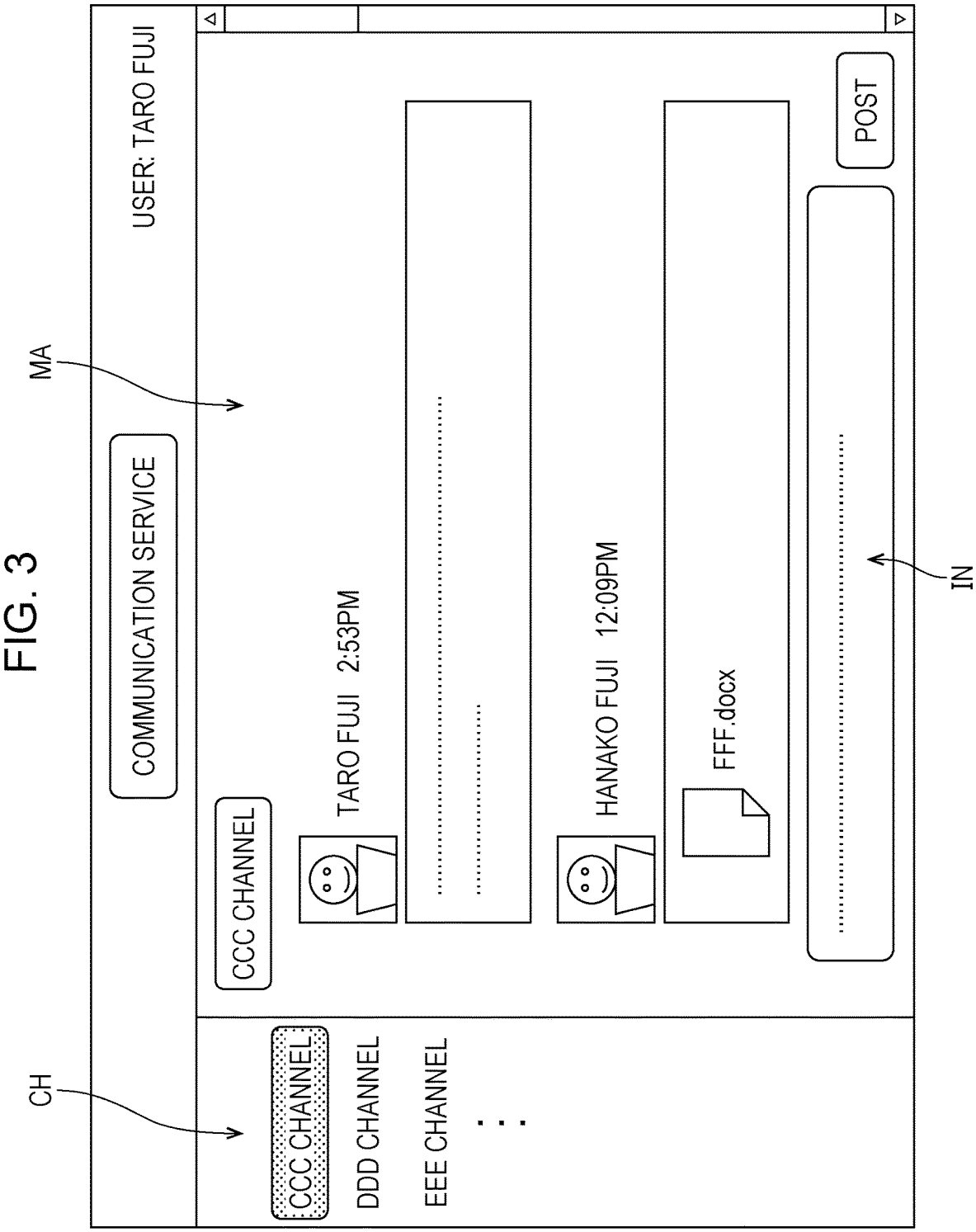
FIG. 3 is a diagram illustrating an example of a message screen provided to a user terminal by a communication service.

FIG. 3 is a diagram illustrating an example of a message screen provided to the user terminal 12 by the communication service. When a user logs in to the communication service, a message screen like the one illustrated in FIG. 3 is displayed on the display of the user terminal 12. In a channel selection area CH of the message screen, a list of channels defined in the communication service is displayed. It may also be configured such that only the channels usable by the user are displayed in the channel selection area CH. When the user selects a desired channel, message that have been posted to the selected channel are displayed in a main area MA of the message screen. Additionally, a message input field IN is displayed in the main area MA. In other words, the main area MA may be considered to be a usage screen for using the channel. The user is able to post a message to the channel by inputting a message into the message input field IN and pressing a post button. Also, by inputting an electronic document as an attachment in the message input field IN, the user is able to post the electronic document to the channel.

In the communication service, users are able to define multiple channels. In the exemplary embodiment, the multiple channels in the communication service do not exist in a hierarchal structure but rather in parallel, but it is also possible to define a hierarchal structure of multiple channels.

Figure 4:
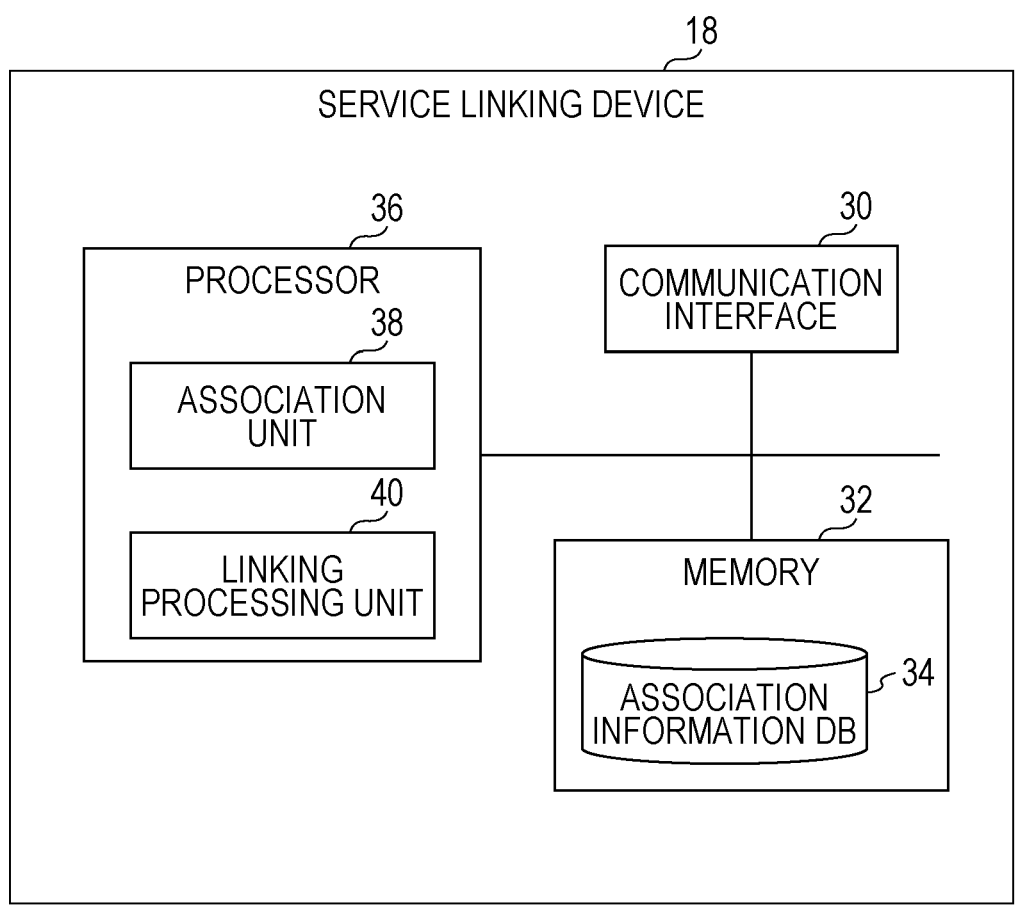
FIG. 4 is a schematic configuration diagram of a service linking device according to the exemplary embodiment.

FIG. 4 is a schematic configuration diagram of the service linking device 18. The service linking device 18 includes a server computer, for example. The functions of the service linking device 18 described below may also be achieved by multiple devices (for example, multiple server computers). Also, in the exemplary embodiment, the activity management service provision device 14 and the service linking device 18 are separate devices, but the activity management service provision device 14 and the service linking device 18 may be the same device. Furthermore, the functions of the service linking device 18 described below may also be functions included in the activity management service.

A communication interface 30 includes a device such as a network adapter, for example. The communication interface 30 exhibits a function of communicating with other devices, such as the activity management service provision device 14 and the communication service provision device 16 for example, through the communication channel 20.

Memory 32 includes a hard disk, a solid-state drive (SSD), ROM, RAM, or the like, for example. The memory 32 may be provided separately from a processor 36 described later, or at least a portion of the memory 32 may be provided internally to the processor 36. The memory 32 stores an information processing program for causing each unit of the service linking device 18 to operate. Also, as FIG. 4 illustrates, the memory 32 stores an association information database (DB) 34.

The association information DB 34 is a database in which the activity element ID that identifies each activity element defined in the activity management service and the channel ID that identifies each channel defined in the communication service are associated with each other. The activity element ID and the channel ID are associated by an association unit 38 of the processor 36 described later.

The processor 36 refers to a processing device in a broad sense, and includes at least one general processing device (such as a central processing unit (CPU), for example) or dedicated processing device (such as a graphics processing unit (GPU), an application-specific integrated circuit (ASIC), a field-programmable gate array (FPGA), or a programmable logic device, for example). The processor 36 may be not only a single processing device, but may also be achieved by the cooperation of multiple processing devices existing in apparatuses located physically apart from each other. As FIG. 4 illustrates, the processor 36 exhibits the functions of an association unit 38 and a linking processing unit 40 according to the information processing program stored in the memory 32. Note that in the following description, the association unit 38 and the linking processing unit 40 execute various processes that intervene in the processes of the activity management service or the communication service. These processes are executed by the activity management service or the communication service in accordance with instructions from the association unit 38 and the linking processing unit 40.

On the basis of an instruction from a user, the association unit 38 causes the association information DB 34 to store an activity element ID that identifies an activity element defined in the activity management service and a channel ID that identifies a channel defined in the communication service in association with each other. Hereinafter, details about the processes by the association unit 38 will be described.

First, on the basis of a user instruction, the association unit 38 associates a tenant defined in the activity management service with a tenant defined in the communication service. In the exemplary embodiment, a user accesses the activity management service and inputs, into the activity management service, login information for logging in to the communication service (such as a tenant ID and a password that identify a tenant in the communication service (obviously, a tenant that the user is able to access)). The activity management service performs an authentication process with respect to the communication service on the basis of the input login information, and acquires a tenant ID that identifies the tenant of the user in the communication service. Additionally, a tenant ID that identifies the tenant of the user in the activity management service and a tenant ID that identifies the acquired tenant in the communication service are transmitted to the service linking device 18. The association unit 38 causes the memory 32 to store both received tenant IDs in association with each other.

With this arrangement, the tenant in the activity management service and the tenant in the communication service are associated, thereby enabling communication between the two services. Bidirectional, interactive processes between the activity management service and the communication service are performed by using Web APIs released to the public by each service. The communication may also take security into account and use an object such as a security token. Note that the two services may also be associated with each other by having the user access the communication service and input login information for logging in to the activity management service. The activity element of the activity management service and the channel of the communication service that are associated with each other in the following description are an activity element in a tenant in the activity management service and a channel in a tenant in the communication service that have been associated with each other as described above.

Figure 5:
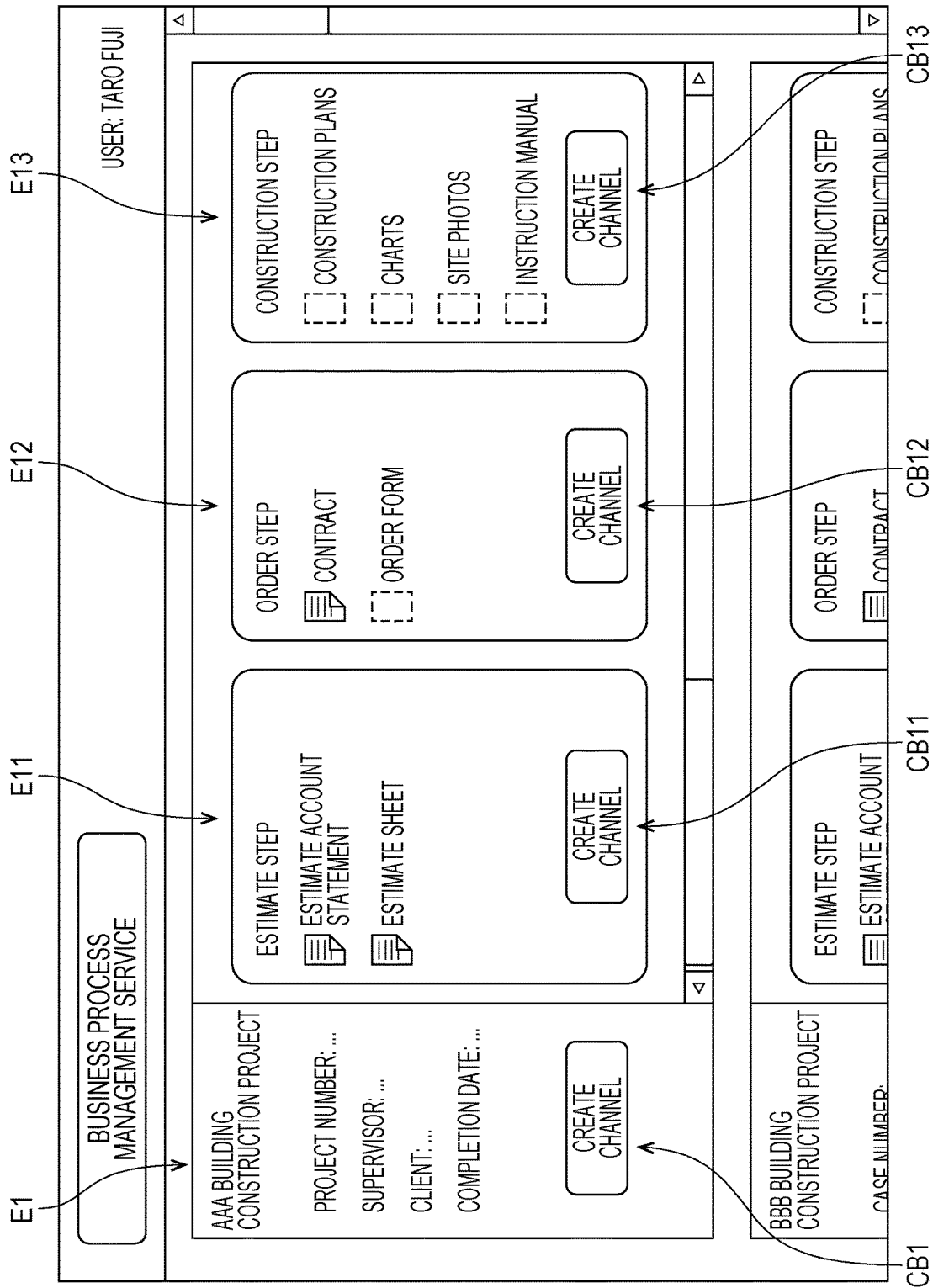
FIG. 5 is a diagram illustrating a first example of a screen on which a create channel button is displayed for each activity element.

As described above, when a user logs in to the activity management service, the activity management screen is displayed on the display of the user terminal 12, and as illustrated in FIG. 5, the association unit 38 causes a create channel button to be displayed in association with each activity element on the activity management screen. In the example of FIG. 5, the association unit 38 causes a create channel button CB1 to be displayed inside the frame E1 indicating the work project ("AAA Building Construction Project") that is the highest superordinate activity element within the activity process. The association unit 38 also causes create channel buttons CB11, CB12, and CB13 to be displayed respectively in the frames E11, E12, and E13 that represent the work steps ("Estimate Step", "Order Step", and "Construction Step") that are the subordinate activity elements of the work project. With this arrangement, the user is able to easily understand the relationship between each activity element and each create channel button.

By operating one of the create channel buttons, the user is able to create a channel in the communication service that corresponds to the activity element corresponding to the create channel button. For example, by operating the create channel button CB1, the user is able to create a channel corresponding to the "AAA Building Construction Project", and by operating the create channel button CB11, the user is able to create a channel corresponding to the "Estimate Step". Note that, although not displayed in FIG. 5, each trail may also be treated as an activity element, and a create channel button may also be displayed in association with each trail. By operating each create channel button, the user is able to create a channel corresponding to each trail.

Figure 6:
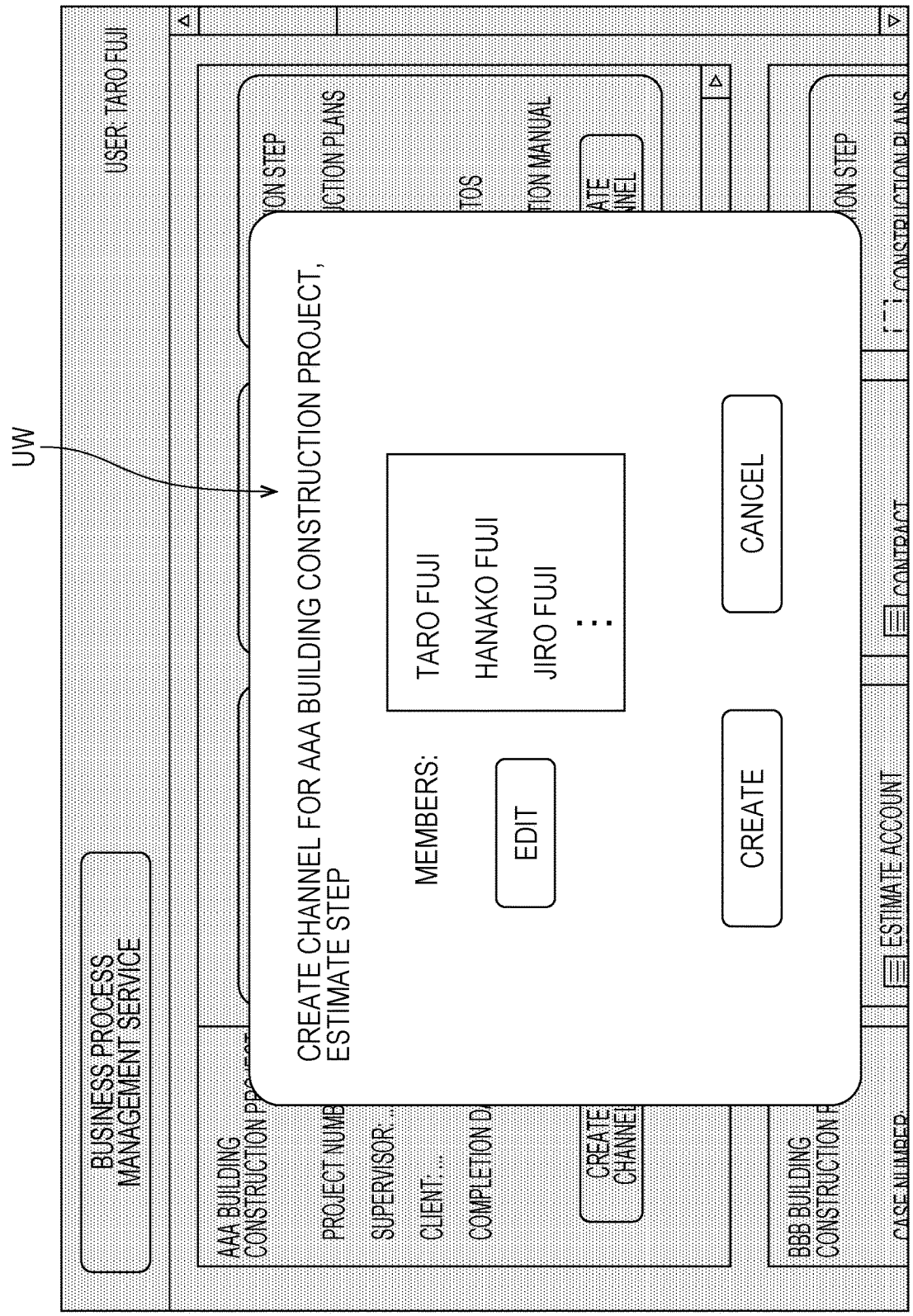
FIG. 6 is a diagram illustrating an example of a channel member setting window.

When the user operates one of the create channel buttons (herein assumed to be the create channel button CB11 associated with the "Estimate Step"), a channel member setting window UW like the one illustrated in FIG. 6 is displayed. On the channel member setting window UW, the user is able to set users who will be able to use the channel corresponding to the "Estimate Step" that the user is about to create.

If the user sets one or more channel members and operates a "Create" button on the channel member setting window UW, the activity management service transmits the activity element ID that identifies the activity element corresponding to the create channel button operated by the user and a channel creation instruction to the service linking device 18. The association unit 38 forwards the channel creation instruction to the communication service, thereby causing a new channel to be created (defined) in the communication service. Also, information indicating the set channel members is transmitted from the activity management service provision device 14 to the communication service provision device 16 and set as the channel members of the new channel in the communication service. The communication service transmits a channel ID that identifies the newly created channel to the service linking device 18.

The service linking device 18 causes the association information DB 34 to store the activity element ID indicating the activity element associated with the create channel button operated by the user and the channel ID indicating the current newly created channel received from the communication service in association with each other. With this arrangement, the activity element in the activity management service and the channel in the communication service are associated with each other.

In the case where multiple activity elements in the activity management service exist in a hierarchal structure while multiple channels in the communication service exist in parallel without being in a hierarchal structure, associating each activity element with each channel causes the channels to exist in a hierarchal structure according to the hierarchal structure of the activity elements. In other words, according to the exemplary embodiment, a hierarchal structure of channels may be defined without defining the hierarchal structure of the channels in the communication service.

As described earlier, in the activity management service, activity element members able to use each activity element may be defined in some cases. In the case where activity element members are defined for the activity element associated with the create channel button operated by the user, the association unit 38 may treat the activity element members of the activity element as the channel members of the channel to be created, without causing the channel member setting window UW to be displayed. In this case, the association unit 38 causes the activity management service to transmit information indicating the activity element members of the activity element to the communication service. Alternatively, the activity element members may be set as the initial values of the channel members of the channel to be created, and then the channel member setting window UW described above may be displayed to enable the user to edit the channel members.

Figure 7:
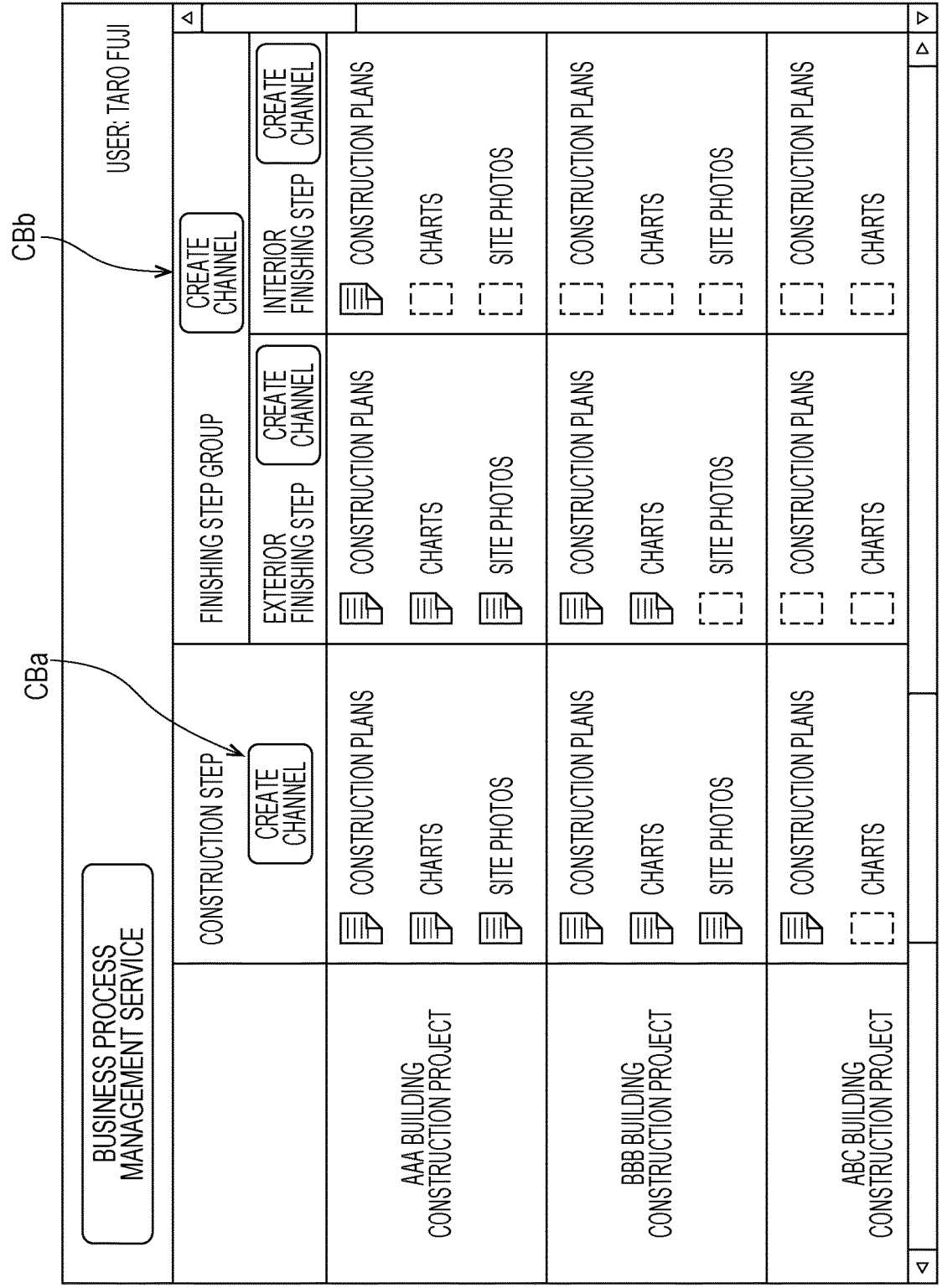
FIG. 7 is a diagram illustrating a second example of a screen on which a create channel button is displayed for each activity element.

The association unit 38 is also capable of associating multiple activity elements spanning multiple activity processes with a single channel. FIG. 7 is a diagram illustrating another example of the activity management screen. In the example of FIG. 7, a common work step (such as "Construction Step") is defined for multiple work projects ("AAA Building Construction Project", "BBB Building Construction Project", and "ABC Building Construction Project"). In such a case, the association unit 38 is capable of associated multiple work steps spanning the multiple work projects, or in other words the multiple activity processes, with a single channel. Specifically, the association unit 38 may cause a create channel button CBa associated with the work step "Construction Step" spanning multiple work projects to be displayed, and by having the user operate the create channel button CBa, a single channel corresponding to the multiple work steps spanning the multiple work projects may be created.

Note that in FIG. 7, a step group "Finishing Step Group" into which multiple steps are collected is illustrated. Because the step group itself is also an activity element, the association unit 38 obviously may display a create channel button CBb associated with the step group. By operating the create channel button CBb, the user is able to create a channel corresponding to the step group.

Returning to FIG. 4, the linking processing unit 40 executes a process of linking activity elements in the activity management service and channels in the communication service associated with each other by the association unit 38.

Figure 8:
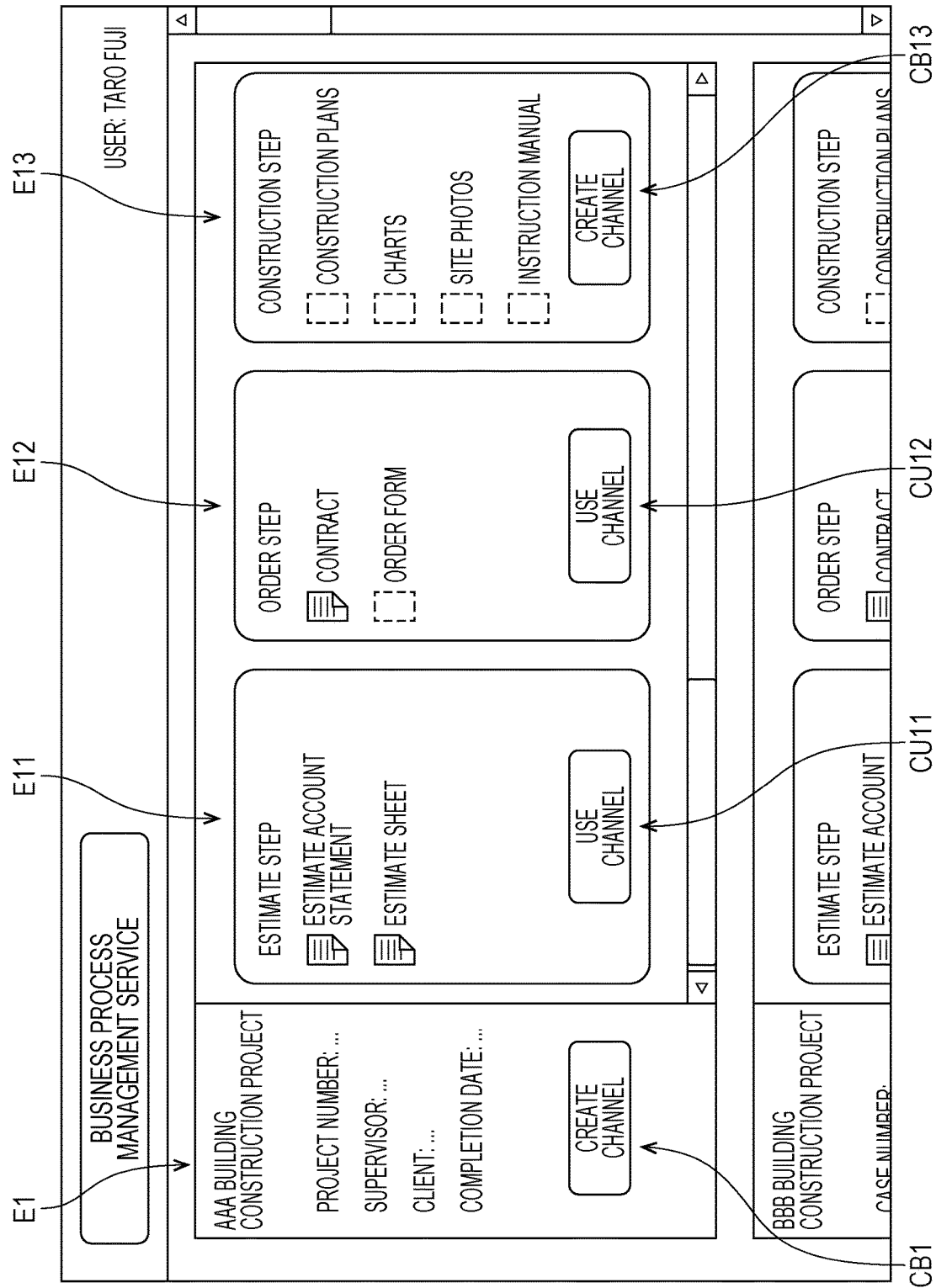
FIG. 8 is a diagram illustrating an example of a screen on which a use channel button is displayed for each activity element having a defined channel.

As illustrated in FIG. 8, the linking processing unit 40 causes a use channel button to be displayed in association with each activity element associated with a channel in the communication service on the activity management screen provided by the activity management service. In the example of FIG. 8, use channel buttons CU11 and CU12 are displayed respectively inside the frames E11 and E12 that represent the work steps "Estimate Step" and "Order Step" of the work project "AAA Building Construction Project". In other words, channels in the communication service are respectively associated with the "Estimate Step" and the "Order Step". On the other hand, in the example of FIG. 8, because a channel is not associated with the work project "AAA Building Construction Project" or with the work step "Construction Step", the create channel button CB1 continues to be displayed inside the frame E1 that represents the "AAA Building Construction Project", and the create channel button CB13 continues to be displayed inside the frame R13 that represents the "Construction Step".

By operating one of the use channel buttons, the user is able to use the channel in the communication service that corresponds to the activity element corresponding to the use channel button. For example, by operating the use channel button CU11, the user is able to use the channel corresponding to the "Estimate Step" of the "AAA Building Construction Project". Because each use channel button is displayed in association with a corresponding activity element, the user operating the use channel button is considered to be synonymous with the user selecting the activity element. Consequently, by having the linking processing unit 40 display each use channel button and by having the user select an activity element on the activity management screen, the user is able to use the channel associated with the selected activity element.

When the user operates one of the use channel buttons (herein assumed to be the use channel button CU11 associated with the "Estimate Step"), the activity management service transmits the activity element ID that identifies the activity element corresponding to the use channel button operated by the user and a channel usage instruction to the service linking device 18. The linking processing unit 40 references the association information DB 34, specifies the channel ID associated with the received activity element ID, and transmits the specified channel ID and the channel usage instruction to the communication service. The communication service transmits channel information (such as posted messages for example) related to the channel indicated by the received channel ID to the activity management service.

Figure 9:
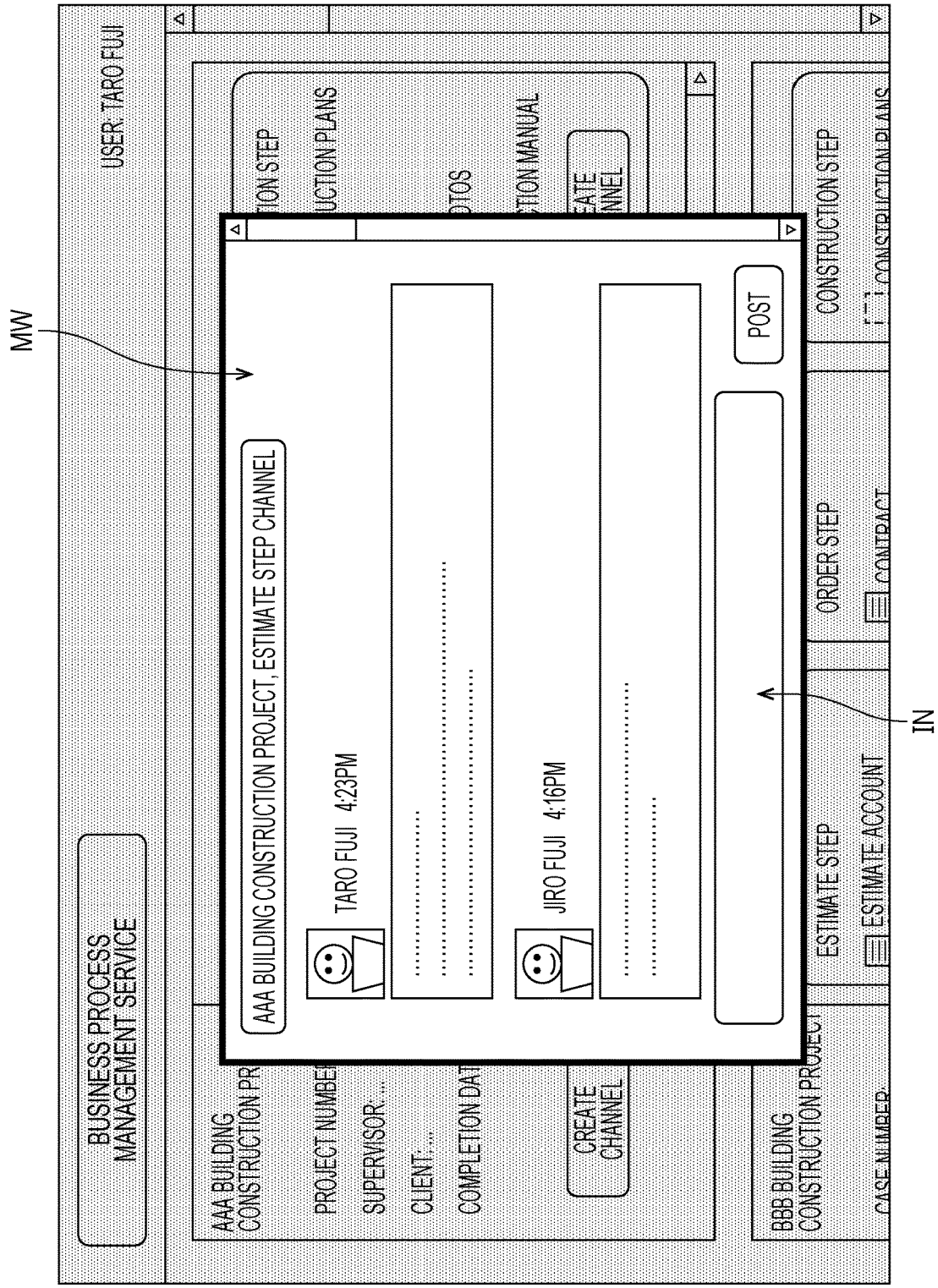
FIG. 9 is a diagram illustrating an example of a screen on which a message window of a channel of the communication service is displayed inside the screen of the activity management service.

On the basis of the received channel information, the activity management service causes a message window MW including a usage screen for using the channel like the one illustrated in FIG. 9 to be displayed inside the activity management screen on the display of the user terminal 12. In the exemplary embodiment, the main area MA (see FIG. 3) of the message screen described earlier that is displayed on the user terminal 12 by the communication service is displayed in the message window MW. Through the message window MW, the user is able to view messages that have been posted to the channel associated with the "Estimate Step". The user is also able to post a message to the channel or post an electronic document as an attachment through the message input field IN displayed in the message window MW.

As described above, because the hierarchal structure of the multiple activity elements is clearly indicated on the activity management screen, according to the exemplary embodiment, by selecting an activity element displayed on the activity management screen, the user is able to use the channel associated with the activity element. Consequently, the user is able to understand where the channel to use is positioned in the hierarchal structure of multiple channels (which corresponds to the hierarchal structure of the multiple activity elements, and furthermore use the channel.

By having multiple channels existing a hierarchal structure, processes like the following are possible, for example. First, the channel members of the channel corresponding to a certain work step are set to only persons who are involved with the work step, and the exchange of messages and attachments related to the work step is executed in the channel. An electronic document whose contents are confirmed through such exchange may also be registered as a trail document of the trail of the work step. On the other hand, the channel members of a channel corresponding to a certain work project superordinate to each work step may be set to all persons involved with the work project, and messages related to topics spanning multiple work steps and messages such as reports to a superior may also be posted to the channel.

Also, to cover cases such as where a superior wants to post a message to all persons involved with a work project, a message posted in a superordinate channel (for example, the channel corresponding to the work project) may also be posted to all channels subordinate to that channel (for example, multiple channels corresponding to multiple work steps).

Also, because the message window MW is displayed inside the activity management screen provided by the activity management service, the user is able to use the communication service from the activity management service without accessing the communication service separately.

Furthermore, the linking processing unit 40 executes a process of linking a channel in the communication service with an activity element in the activity management service associated with the channel according to a user operation with respect to the communication service. Specifically, in the case where the user selects an electronic document already posted as an attachment to a channel in the communication service, the linking processing unit 40 causes the electronic document to be registered as the trail document of the trail of the activity element in the activity management service associated with the channel.

Figure 10:
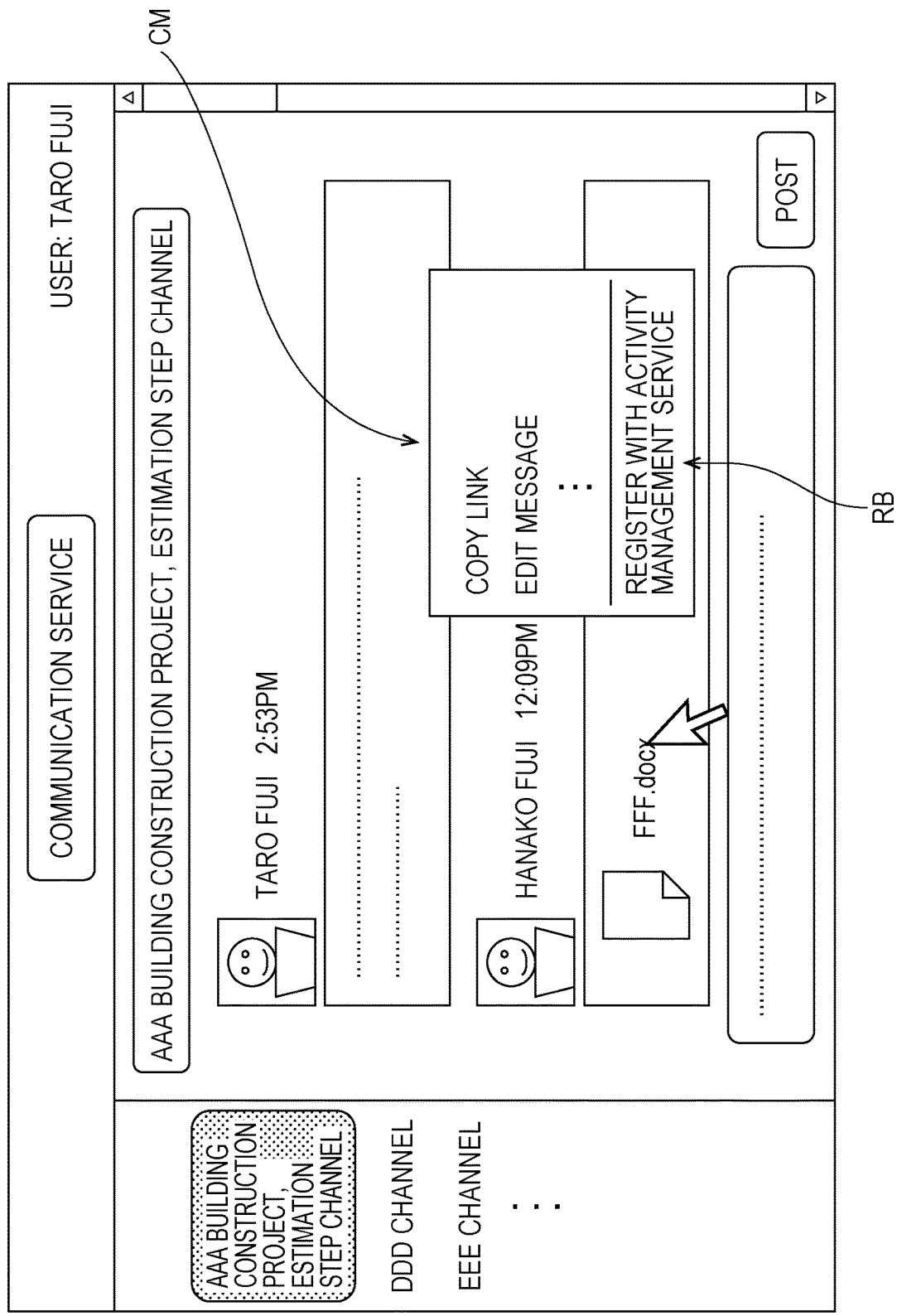
FIG. 10 is a diagram illustrating an example of a context menu displayed on a message screen.

First, as illustrated in FIG. 10, if the user selects an electronic document already posted to a channel on a message screen of the communication service (for example, if the user moves a cursor over an icon of an electronic document and right-clicks), a context menu CM is displayed. The linking processing unit 40 causes a register button RB labeled "Register with activity management service" to be displayed in the context menu CM. For example, an extension provided by the communication service may be used as the method of causing the register button RB to be displayed in the context menu CM.

If the user operates the register button RB, the communication service determines that an electronic document registration instruction for registering the selected electronic document as a trail document of a trail in the activity management service has been received from the user, and transmits the channel ID indicating the channel to which the electronic document was posted to the service linking device 18. The linking processing unit 40 references the association information DB 34, specifies the activity element ID associated with the received channel ID, and transmits the specified activity element ID together with a trail information request instruction for causing the communication service to request trail information related to the trail defined for the activity element indicated by the activity element ID to the communication service.

In response to the received trail information request instruction, the communication service transmits the received activity element ID together with a trail information request to the activity management service. The activity management service receiving the trail information request transmits trail information including each trail ID of one or multiple trails defined for the activity element indicated by the received activity element ID (hereinafter referred to as the "target activity element") to the communication service. In the exemplary embodiment, the trail information includes information indicating the name of the trail indicated by each trail ID associated with each trail ID. In this way, because the trail information request instruction transmitted to the communication service by the linking processing unit 40 causes the communication service to transmit the trail information request to the activity management service, and the activity management service transmits trail information to the communication service in response, it may be said that the linking processing unit 40 causes the activity management service to transmit the trail information to the communication service.

The communication service references the received trail information, and in the case where a single trail is defined for the target activity element, the communication service registers the electronic document selected by the user as the trail document of the trail in the activity management service. In other words, the communication service transmits the trail ID included in the received trail information and the electronic document selected by the user to the activity management service, and registers the electronic document as the trail document of the trail indicated by the trail ID. With this arrangement, the electronic document is transmitted from the communication service to the activity management service and managed as the trail document of the trail in the activity management service.

In the case where multiple trails are defined for the target activity element in the received trail information, the communication service causes the user to select the trail in which to register the electronic document from among the trails indicated by multiple trail IDs on the basis of the multiple trail IDs included in the trail information. In the exemplary embodiment, the communication service causes a list of the multiple trails defined for the target activity element to be displayed on the message screen, on the basis of the multiple trail IDs and information indicating the name of each trail indicated by each trail ID included in the trail information.

As described above, in the exemplary embodiment, although multiple activity elements are defined in a hierarchal structure in the activity management service, the linking processing unit 40 may be suitably configured to cause the activity management service receiving an activity element ID and a trail information request from the communication service to transmit, to the communication service, hierarchy information indicating at least a portion of the hierarchal structure and includes the target activity element. The portion of the hierarchal structure includes the target activity element and another activity element superordinate to the target activity element, and/or the target activity element and another activity element subordinate to the target activity element, for example. Additionally, in cases such as where the number of activity elements defined in the activity management service is not numerous, the hierarchy information may also indicate the entire hierarchal structure defined in the activity management service.

Figure 11:
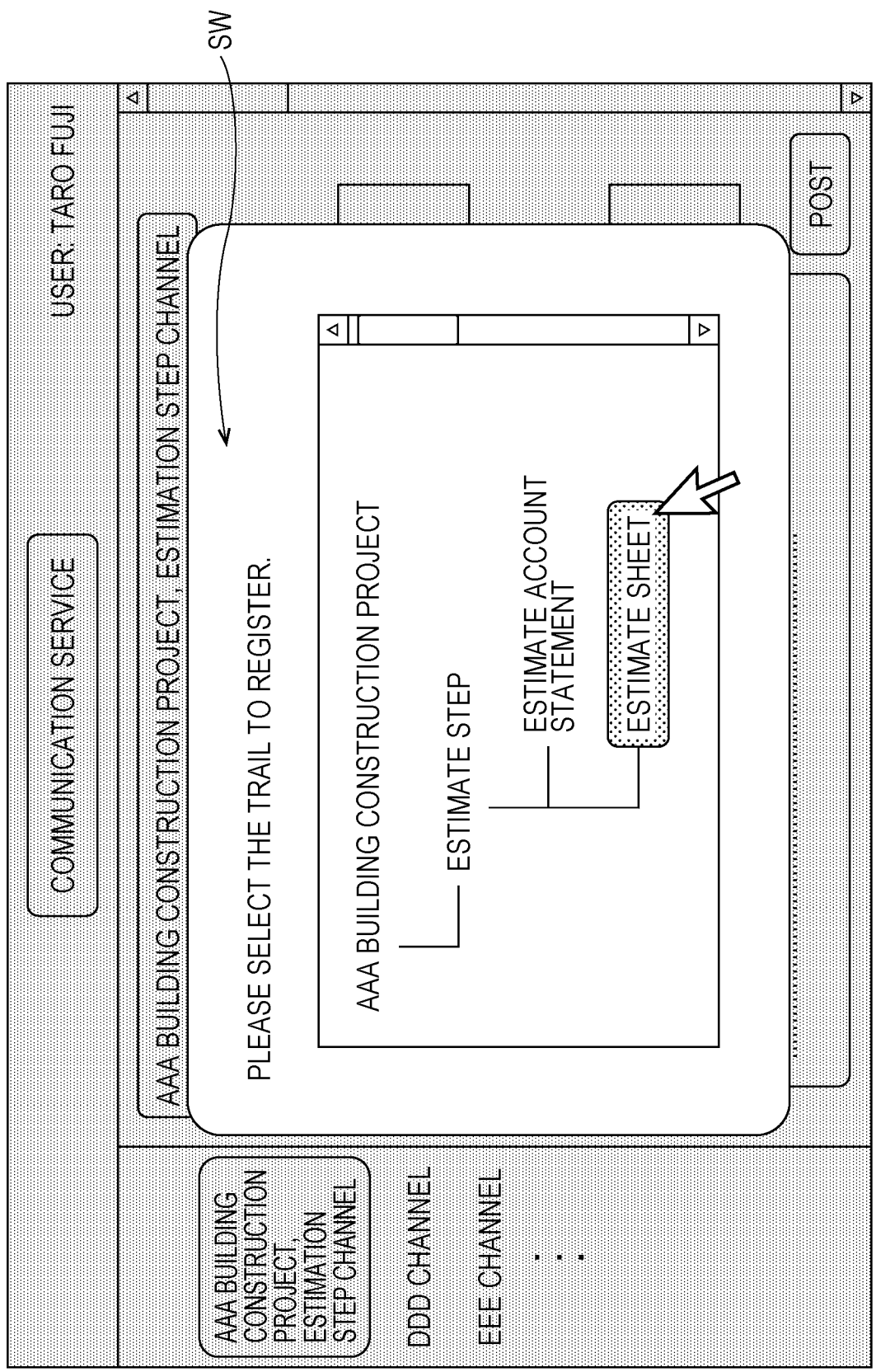
FIG. 11 is a diagram illustrating an example of a trail selection window.

In the case where hierarchy information is received together with trail information, the communication service causes the portion of the hierarchal structure to be displayed on the message screen together with the list of multiple trails defined for the target activity element. In the exemplary embodiment, the communication service causes a trail selection window SW like the one illustrated in FIG. 11 to be displayed. The trail selection window SW illustrated in FIG. 11 indicates that the work project "AAA Building Construction Project" is the superordinate activity element of the target activity element, namely the work step "Estimate Step". In addition, the trail selection window SW illustrates the trail "Estimate Account Statement" and the trail "Estimate Sheet" defined for the target activity element ("Estimate Step"). In the trail selection window SW, it is beneficial for these trails to be displayed in a format indicating that the trails are defined for the target activity element.

By displaying the portion of the hierarchal structure on the message screen, the user is able to select the trail in which to register the selected electronic document while also understanding the hierarchal structure of other activity elements superordinate or subordinate to the target activity element.

When the user selects a desired trail from among the multiple trails displayed on the message screen, the communication service transmits the electronic document selected by the user and the trail ID of the trail selected by the user to the activity management service, and registers the electronic document as the trail document of the trail in the activity management service.

In the exemplary embodiment, the user is also able to register an electronic document selected in the communication service as the trail for which another electronic document is already registered as a trail document in the activity management service. For example, even if a trail document is already registered as the trail "Estimate Sheet" in the activity management service, the user is able to register an electronic document selected in the communication service as the trail of the trail "Estimate Sheet". In the case where a trail document is already registered for the trail specified as the registration destination of the electronic document selected by the user, the activity management service registers the electronic document selected by the user as a different version (for example, version 2) of the trail document.

In the example described above, by having the user operate the register button RB (see FIG. 10), the linking processing unit 40 receiving a channel ID from the communication service transmits the activity element ID associated with the received channel ID and a trail information request instruction to the communication service, but in the case where the channel ID is received from the communication service, the linking processing unit 40 may also be configured to transmit the activity element ID associated with the received channel ID and a trail information transmission instruction to the activity management service. The activity management service receiving the trail information transmission instruction transmits trail information including each trail ID of one or multiple trails defined for the target activity element, that is, the activity element indicated by the received activity element ID, to the communication service. The following process is similar to the example described above.

Figure 12:
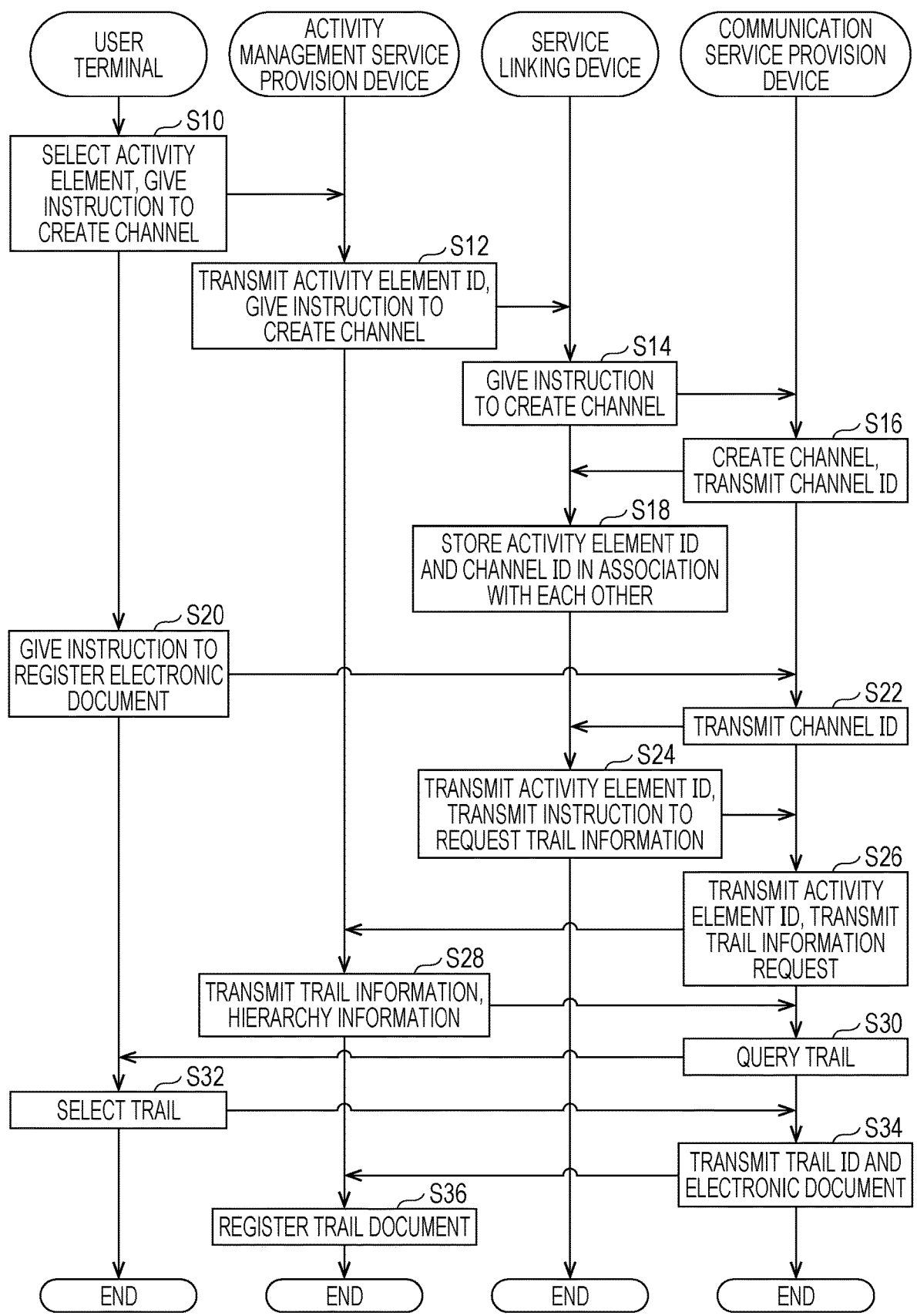
FIG. 12 is a flowchart illustrating a flow of processes by the service linking system according to the exemplary embodiment.

Hereinafter, the flow of processes by the service linking system 10 will be described by following the flowchart illustrated in FIG. 12. It is assumed that when the flowchart in FIG. 12 starts, the tenant of a user in the activity management service and the tenant of the user in the communication service have already been associated with each other. In the flowchart in FIG. 12, steps S10 to S18 are steps related to a process of associating an activity element in the activity management service with a channel in the communication service, while step S20 and thereafter are steps related to a process of registering an electronic document already posted to the communication service as a trail in the activity management service.

In step S10, on the activity management screen (see FIG. 5) displayed on the user terminal 12, the user operates the create channel button displayed in association with each of multiple activity elements displayed hierarchically. Consequently, the activity element ID that identifies the activity element corresponding to the operated create channel button and a channel creation instruction are transmitted from the user terminal 12 to the activity management service provision device 14.

In step S12, the activity management service provision device 14 forwards the received activity element ID and the channel creation instruction to the service linking device 18.

In step S14, the association unit 38 of the service linking device 18 forwards the received channel creation instruction to the communication service provision device 16.

In step S16, the communication service provision device 16 creates a new channel according to the received channel creation instruction. Additionally, the communication service provision device 16 transmits a channel ID that identifies the created channel to the service linking device 18.

In step S18, the association unit 38 of the service linking device 18 causes the association information DB 34 to store the activity element ID received in step S12 and the channel ID received in step S16 in association with each other.

In step S20, the user accesses the communication service, selects an electronic document already posted as an attachment to a selected channel on the message screen (see FIG. 10) displayed on the user terminal 12, and operates the register button RB from the context menu CM. With this arrangement, an electronic document registration instruction is transmitted from the user terminal 12 to the communication service provision device 16.

In step S22, the communication service provision device 16 transmits the channel ID of the channel to which the electronic document selected by the user was posted to the service linking device 18.

In step S24, the linking processing unit 40 of the service linking device 18 references the association information DB 34 and specifies the activity element ID associated with the received channel ID. Additionally, the linking processing unit 40 transmits the specified activity element ID and a trail information request instruction to the communication service provision device 16.

In step S26, the communication service provision device 16 transmits the received activity element ID and a trail information request to the activity management service provision device 14 according to the received trail information request instruction.

In step S28, the activity management service provision device 14 transmits trail information including the trail ID of each trail defined for a target activity element indicated by the received activity element ID as well as hierarchy information indicating a portion of the hierarchal structure that includes the target activity element to the communication service provision device 16 according to the received trail information request.

In step S30, the communication service provision device 16 causes the trail selection window SW (see FIG. 11) to be displayed on the display of the user terminal 12 on the basis of the received trail information and hierarchy information, and queries the user regarding the trail in which to register the electronic document.

In step S32, the user selects a desired trail in the trail selection window SW displayed on the user terminal 12. With this arrangement, the trail ID indicating the selected trail is transmitted from the user terminal 12 to the communication service provision device 16.

In step S34, the communication service provision device 16 transmits the trail ID of the trail selected by the user and the electronic document selected by the user in step S20 to the activity management service provision device 14.

In step S36, the activity management service provision device 14 registers the received electronic document as the trail document of the trail indicated by the received trail ID.

The foregoing describes an exemplary embodiment of the present disclosure, but the present disclosure is not limited to the exemplary embodiment, and various modifications are possible without departing from the scope of the present disclosure.

In the embodiment above, the term "processor" refers to hardware in a broad sense. Examples of the processor include general processors (e.g., CPU: Central Processing Unit), and dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
a processor configured to
cause an activity element identifier that identifies an activity element defined in a hierarchical structure in an activity management service, and for which a trail that indicates an electronic document to be registered is defined, to be stored in a memory in association with a channel identifier that identifies a channel defined in a communication service provided by a separate system from a system providing the activity management service, and
in a case where an electronic document already posted to the channel is selected by a user on a message screen displayed in the communication service outside of the activity management service,
cause a change in the message screen to display a portion of the hierarchical structure from the activity management service,
receive a selection from the user selecting a target activity element on the message screen displaying the portion of the hierarchical structure,
cause the electronic document to be automatically registered as the trail of the target activity element within the activity management service outside of the communication service.

2. The information processing device according to claim 1, wherein
in the activity management service, one or a plurality of steps involved in completing an activity process are defined as the activity element, and the trail is plurally defined for at least one of the one or plurality of steps.

3. The information processing device according to claim 1, wherein
the processor is configured to cause an electronic document selected by the user to be registered as the trail by causing the activity management service to transmit a trail identifier that identifies the trail defined for the activity element to the communication service, on a basis of the activity element identifier of the activity element associated with the channel specified on a basis of the channel identifier of the channel to which the electronic document selected by the user is posted.

4. The information processing device according to claim 2, wherein
the processor is configured to cause an electronic document selected by the user to be registered as the trail by causing the activity management service to transmit a trail identifier that identifies the trail defined for the activity element to the communication service, on a basis of the activity element identifier of the activity element associated with the channel specified on a basis of the channel identifier of the channel to which the electronic document selected by the user is posted.

5. The information processing device according to claim 3, wherein
a plurality of trails are defined for the activity element, and
the processor is configured to cause the activity management service to transmit, to the communication service, a plurality of trail identifiers that identify the plurality of trails defined for the activity element associated with the channel to which the electronic document selected by the user is posted, and cause the user to select the trail in which to register the electronic document in the communication service.

6. The information processing device according to claim 4, wherein
a plurality of trails are defined for the activity element, and
the processor is configured to cause the activity management service to transmit, to the communication service, a plurality of trail identifiers that identify the plurality of trails defined for the activity element associated with the channel to which the electronic document selected by the user is posted, and cause the user to select the trail in which to register the electronic document in the communication service.

7. The information processing device according to claim 5, wherein
in the activity management service, a plurality of activity elements are defined in the hierarchal structure, and
the processor is configured to cause the activity management service to additionally transmit, to the communication service, information indicating at least the portion of the hierarchical structure and including the activity element associated with the channel to which the electronic document selected by the user is posted, and cause the message screen indicating at least the portion of the hierarchical structure to be displayed in the communication service outside of the activity management service.

8. The information processing device according to claim 6, wherein
in the activity management service, a plurality of activity elements are defined in the hierarchal structure, and
the processor is configured to cause the activity management service to additionally transmit, to the communication service, information indicating at least the portion of the hierarchal structure and including the activity element associated with the channel to which the electronic document selected by the user is posted, and cause the message screen indicating at least the portion of the hierarchal structure to be displayed in the communication service outside of the activity management service.

9. The information processing device according to claim 1, wherein in a case where another electronic document is already registered as the trail of the target activity element, the activity management service registers the electronic document selected by the user as another version of the trail different from the other electronic document.

10. The information processing device according to claim 2, wherein
in a case where another electronic document is already registered as the trail of the target activity element, the activity management service registers the electronic document selected by the user as another version of the trail different from the other electronic document.

11. The information processing device according to claim 3, wherein
in a case where another electronic document is already registered as the trail of the target activity element, the activity management service registers the electronic document selected by the user as another version of the trail different from the other electronic document.

12. The information processing device according to claim 4, wherein
in a case where another electronic document is already registered as the trail of the target activity element, the activity management service registers the electronic document selected by the user as another version of the trail different from the other electronic document.

13. The information processing device according to claim 5, wherein
in a case where another electronic document is already registered as the trail of the target activity element, the activity management service registers the electronic document selected by the user as another version of the trail different from the other electronic document.

14. The information processing device according to claim 6, wherein
in a case where another electronic document is already registered as the trail of the target activity element, the activity management service registers the electronic document selected by the user as another version of the trail different from the other electronic document.

15. The information processing device according to claim 7, wherein
in a case where another electronic document is already registered as the trail of the target activity element, the activity management service registers the electronic document selected by the user as another version of the trail different from the other electronic document.

16. The information processing device according to claim 8, wherein
in a case where another electronic document is already registered as the trail of the target activity element, the activity management service registers the electronic document selected by the user as another version of the trail different from the other electronic document.

17. A non-transitory computer readable medium storing a program causing a computer to execute a process for processing information, the process comprising:
causing an activity element identifier that identifies an activity element defined in a hierarchical structure in an activity management service, and for which a trail that indicates an electronic document to be registered is defined, to be stored in a memory in association with a channel identifier that identifies a channel defined in a communication service provided by a separate system from a system providing the activity management service, and in a case where an electronic document already posted to the channel is selected by a user on a message screen displayed in the communication service outside of the activity management service,
  causing a change in the message screen to display a portion of the hierarchical structure from the activity management service,
  receiving a selection from the user selecting a target activity element on the message screen displaying the portion of the hierarchical structure,
  causing the electronic document to be automatically registered as the trail of the target activity element within the activity management service outside of the communication service.

18. An information processing device comprising:
means for causing an activity element identifier that identifies an activity element defined in a hierarchical structure in an activity management service, and for which a trail that indicates an electronic document to be registered is defined, to be stored in a memory in association with a channel identifier that identifies a channel defined in a communication service provided by a separate system from a system providing the activity management service; and
means for, in a case where an electronic document already posted to the channel is selected by a user on a message screen displayed in the communication service outside of the activity management service,
  causing a change in the message screen to display a portion of the hierarchical structure from the activity management service,
  receiving a selection from the user selecting a target activity element on the message screen displaying the portion of the hierarchical structure, and
  causing the electronic document to be automatically registered as the trail of the target activity element within the activity management service outside of the communication service.

* * * * *